Oct. 9, 1962 SIGERU MORITA ETAL 3,057,672

CABINET MOUNTING SYSTEM

Filed Sept. 7, 1960 2 Sheets-Sheet 1

*Inventor*
S.MORITA-S.ABE
By Paul W. Henninger
Agent

CABINET MOUNTING SYSTEM

Filed Sept. 7, 1960 2 Sheets-Sheet 2

Inventors
S. MORITA - S. ABE
BY RP Morris

United States Patent Office 3,057,672
Patented Oct. 9, 1962

3,057,672
CABINET MOUNTING SYSTEM

Sigeru Morita and Seiichi Abe, Tokyo, Japan, assignors to Nippon Electric Company, Limited, Tokyo, Japan, a corporation of Japan Filed Sept. 7, 1960, Ser. No. 54,391
Claims priority, application Japan Sept. 16, 1959
7 Claims. (Cl. 312—330)

This invention relates in general to a cabinet mounting system and in particular to a system for the mounting of electronic components within such cabinet.

It is an object of the present invention to provide a mounting arrangement within a cabinet wherein the mounted components and the associated wiring are equally accessible.

It is a further object to provide a mounting arrangement wherein cooling is provided by natural air convection.

It is another object to provide a mounting arrangement which offers stability of cabinet drawer supporting rails within the cabinet and to provide increased reliability under load conditions as compared with parallel rails arranged on the same horizontal level.

The above-mentioned and other features and objects of this invention and the manner of attaining them will become more apparent and the invention itself will be best understood by reference to the following description of an embodiment of the invention taken in conjunction with the accompanying drawings, wherein.

Figure 3:
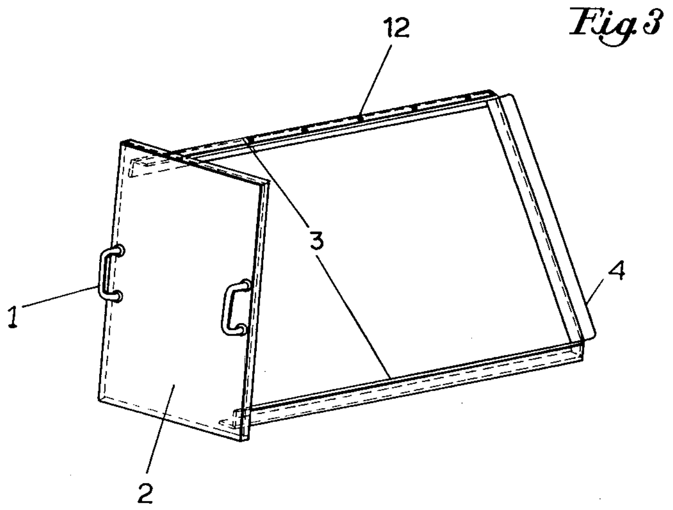
FIG. 3 is a perspective view of a portion of the drawer.

The cabinet drawers in which the components are to be mounted consist of a front panel 2 having handles 1 attached thereto. Angle bars 3 extend from diagonally opposite corners at right angles, to the back surface of front plate 2 (see FIG. 3). These angle bars serve a duel purpose. These bars support sliding rails 7 by means of which the drawer of the cabinet is opened and closed, and they also serve as supports for mounting the component panel 5. An L-shaped member 4 is connected at the ends of angle bars 3 to provide reinforcement therefor. The surface C of the L shaped member 4 is used as a connector mounting surface for making connections external to the cabinet drawer. Rail guides 8 are provided along the cabinet structure 9 into which sliding rails 7 can be inserted so that the drawer may be opened or closed with respect to the cabinet structure.

Figure 1:
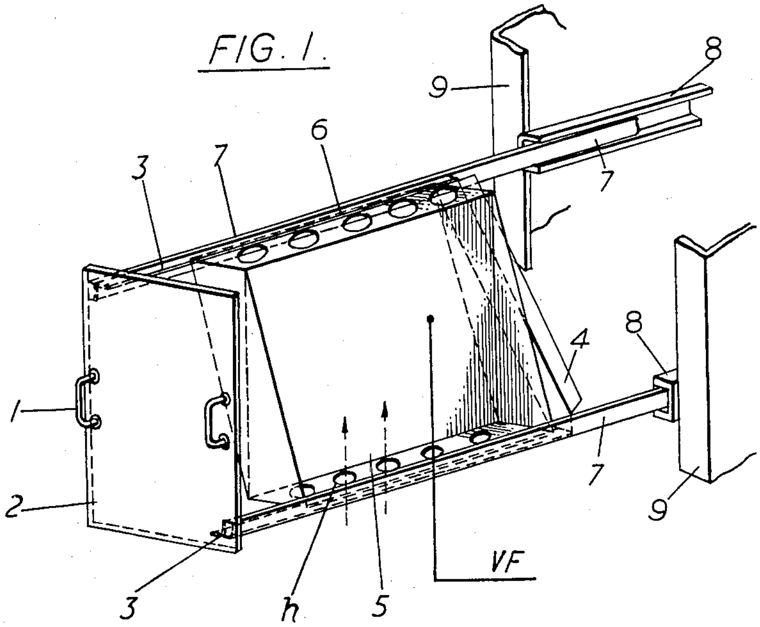
FIG. 1 is a perspective view of the cabinet mounting system.
Figure 2:
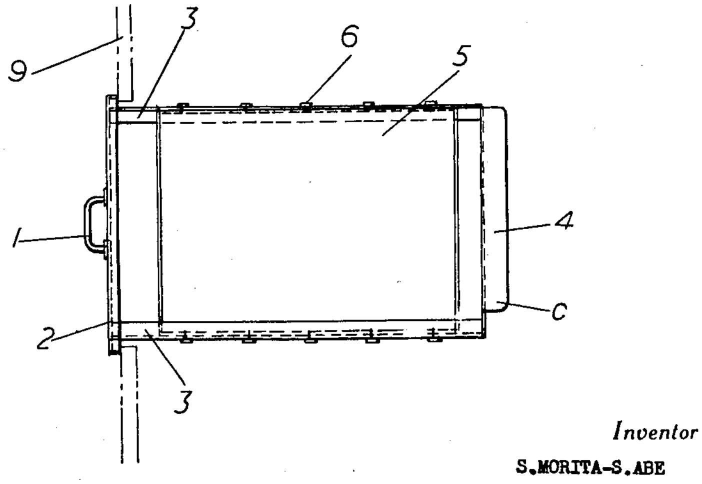
FIG. 2 is a side view of the mounting system of FIG. 1.
Figure 4:
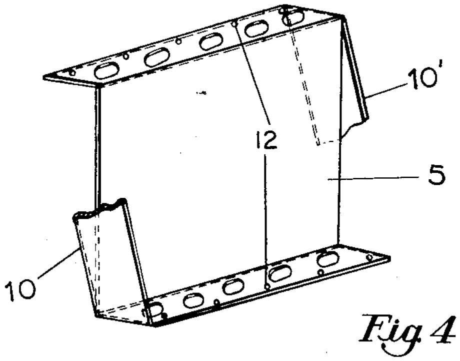
FIG. 4 is a fragmentary perspective view of the component panel and parallelogram end plates.
Figure 5:
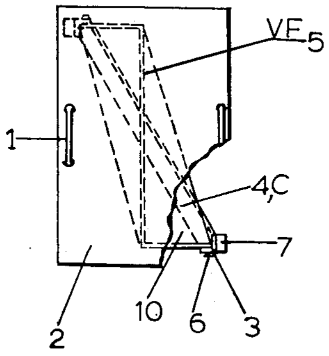
FIG. 5 is a front view of the drawer.

Referring to FIG. 1 and more particularly FIG. 4 it can be seen that the ends of the component panel 5 are reinforced by parallelogram end plates 10 and 10'. When the component panel is mounted in position by attaching the mounting panel 5 to angle bars 3 by means of screws 6 engaged in threaded holes 12 of the angle bars 3 shown in FIGS. 3 and 4, the vertical face (VF) of the mounting panel 5 is maintained vertical. This surface lies along a diagonal of the parallelogram shaped end plates 10 and 10'.

The above defined VF surface is designed to serve as the mounting surface of the component parts, such as tubes and other electronic components. The wiring may extend through the surface and be accessible, on the other side. Accordingly, maintenance and inspection of the component parts and the associated wiring can be easily made by opening the drawer of the cabinet. Holes *h* are provided in the upper and lower plates of the mounting panel 5 to provide air cooling by natural convection. The dotted arrows associated with holes *h* indicate the direction of air flow.

In actual use the surface of the front panel 2 is usually finished with enamel or lacquer. It can be seen that this surface is not subject to scratching etc., when components are serviced or when the entire mounting panel is removed or inserted.

It is to be understood that the foregoing description of specific examples of this invention is not to be considered as a limitation on its scope.

We claim:

1. A slidable cabinet drawer for the mounting of electrical components with their associated wiring comprising a front panel; a pair of angle bars mounted on the rear surface of said panel substantially perpendicular thereto, each at one end of a bisecting diagonal; sliding means mounted coextensively on each of said pair of angle bars; a chassis member having a Z shaped cross-section, the upper and lower flanges of said Z shaped member being fixedly joined at the ends thereof to said angle bars.

2. A slidable cabinet drawer as claimed in claim 1 in which upper and lower flanges of said Z shaped member are perpendicular to the portion of said Z shaped member connecting the flanges.

3. A slidable cabinet drawer as claimed in claim 2 further comprising means attached to said Z shaped member for maintaining the structural rigidity thereof.

4. A slidable cabinet drawer as claimed in claim 3 in which said means consists of parallelogram end plates closing both ends of said member.

5. A slidable cabinet drawer as claimed in claim 1 in which said sliding means consists of a low friction rail.

6. A slidable cabinet drawer as claimed in claim 2 in which both flanges of said Z shaped member have apertures therethrough for air convection.

7. A slidable cabinet drawer as claimed in claim 2 further comprising a reinforcing member mounted between said angle bars, said reinforcing member being adapted to receive connecting terminals.

References Cited in the file of this patent

UNITED STATES PATENTS

| | | |
|---|---|---|
| 2,411,528 | Dodington | Nov. 26, 1946 |
| 2,486,764 | Singer | Nov. 1, 1949 |
| 2,826,475 | Larson | Mar. 11, 1958 |
| 2,888,308 | Devine et al. | May 26, 1959 |